United States Patent [19]

Galland

[11] 4,311,288

[45] Jan. 19, 1982

[54] STRAP WINDING MECHANISM

[75] Inventor: Gerald D. Galland, Puyallup, Wash.

[73] Assignee: Jerry H. Webster, Seattle, Wash.

[21] Appl. No.: 209,994

[22] Filed: Nov. 24, 1980

[51] Int. Cl.³ .............................................. B65H 17/46
[52] U.S. Cl. .............................................. 242/86.5 R
[58] Field of Search ................ 242/86.5 R, 86.52, 60, 242/67.1 R, 68, 86.2, 106

[56] References Cited

U.S. PATENT DOCUMENTS

| 498,307 | 5/1893 | Rule | 242/86.5 R |
|---|---|---|---|
| 2,811,321 | 10/1957 | La Barre | 242/86.52 |
| 3,478,980 | 11/1969 | Raasch | 242/86.52 |
| 3,827,650 | 8/1974 | Stevens et al. | 242/86.5 R |
| 4,007,887 | 2/1977 | Vice | 242/86.5 R |

*Primary Examiner*—Edward J. McCarthy
*Attorney, Agent, or Firm*—Graybeal & Uhlir

[57] ABSTRACT

A strap winding mechanism for the winding of truck load straps and the like comprising a stanchion having a clamp at the lower end thereof for generally vertical demountable attachment to any selected stake hole of a conventional flat bed truck. The upper end of the stanchion has a plurality of generally horizontal journal apertures at various azimuthal attitudes for selective journalling of a reel handle and a bifurcated open-ended reel assembly in any of the journal apertures. The reel handle and reel spindle are threaded complementarily and thus readily assembled and readily reversible in the journal apertures, and readily disassembled for compact storage.

8 Claims, 5 Drawing Figures

STRAP WINDING MECHANISM

BACKGROUND OF THE INVENTION

1. Field of the Invention

The present invention relates to a device for the rolling of elongate strapping or the like and in particular to a strap winding mechanism for the rolling of truck load straps or the like.

2. Description of the Prior Art

U.S. Pat. No. 498,307, granted to Rule, discloses a reeling device attachable to upper and lower edges of the side of a wagon for the winding and unwinding of wire. This mechanism does not provide flexibility of use or ease of storage in that its reelshaft and crank are integral and journalled in a fixed yoke so that any material on the reel is not readily removable as a wound unit. Moreover, any given attitude of the Rule yoke and reel with respect to mounting brackets of the device is obtained by rotation of the yoke with respect to the brackets, and as shown on page 2 of Rule, lines 9-10, the yoke and reel must be "guided, controlled and steadied by means of the handle 30".

U.S. Pat. No. 4,007,887, granted to Vice, discloses a strap rolling device consisting of a crank handle and reel spindle which are separable from a supporting frame. The supporting frame is in turn separable from a truck bed mounting bracket. Though this structure permits disengagement of the wound material from the reel spindle, the disengagement can only take place once the reel spindle and crank handle have been taken from the supporting frame, allowing the roll of material to drop from the frame member. Each time it is desired to remove a roll of material from the reel spindle, the crank handle and reel spindle must be removed completely from the mechanism. In addition, the device is not arrangeable in a plurality of positions to allow for possible obstructions to the use of the device, and the disclosed embodiment of this device requires the permanent attachment of mounting brackets to the truck bed for the device even though it may be used only occasionally.

U.S. Pat. No. 3,287,650, granted to Stevens et al, discloses a cable storage means which consists of a spring loaded drum assembly mounted on the bangboard of a truck. While appropriate for the winding of cables for which it is intended, this spring loaded drum is too unwieldy for use in winding conventional load straps or the like. The load straps would also need to be furnished with attachments to be compatible with the spring-loaded function of the Stevens' device.

Two different types of truck tarpaulin reels are shown by U.S. Pat. No. 3,478,980, granted to Raasch, and U.S. Pat. No. 2,811,321, granted to La Barre.

SUMMARY OF THE INVENTION

It is an object and feature of the present invention to provide a windup reel device for truck load strapping and the like which uses a base clamping feature on a stanchion for the upright mounting of the stanchion in any selected stake hole of a conventional truck bed, and also provides for easy demounting and disassembly of the stanchion for storage. Any unobstructed stake hole can be chosen for the mounting of the stanchion, obviating the need for special mounting brackets.

It is another object and feature of this invention to provide a reel device which is convenient and adaptable in that, through opposite sides of the stanchion, a reel assembly and reel handle can be engaged for mutual rotation and later disengaged so that the positions of the reel assembly and handle can be shifted or interchanged, and so that the reel handle and reel assembly may be removed for storage.

Another object of the invention is to provide for a positioning of the reel handle and assembly in any one of several attitudes (e.g. four positions) with respect to the stanchion itself, so that load or ground obstructions to the operation of the device are avoided. The invention therefore features a stanchion having several journal apertures for the arrangement of the reel assembly and reel handle in several horizontal attitudes with respect to the vertical stanchion axis.

As a further feature of the present invention, the stanchion portion of the device, in its dimension between its base clamp and the reel spindle, is preferably of sufficient height (e.g. about nine to eighteen inches) to permit longer lengths of strapping to be coiled on the reel than is possible with conventional strap reels journaled at the side of the truck bed.

An additional feature provided is an open-ended bifurcated reel assembly which permits ready axial separation of the material roll from the reel assembly without dismantling any portion of the device.

BRIEF DESCRIPTION OF THE DRAWINGS

In the drawings, like element designations refer to like parts throughout, and.

DESCRIPTION OF THE PREFERRED EMBODIMENTS

Figure 1:
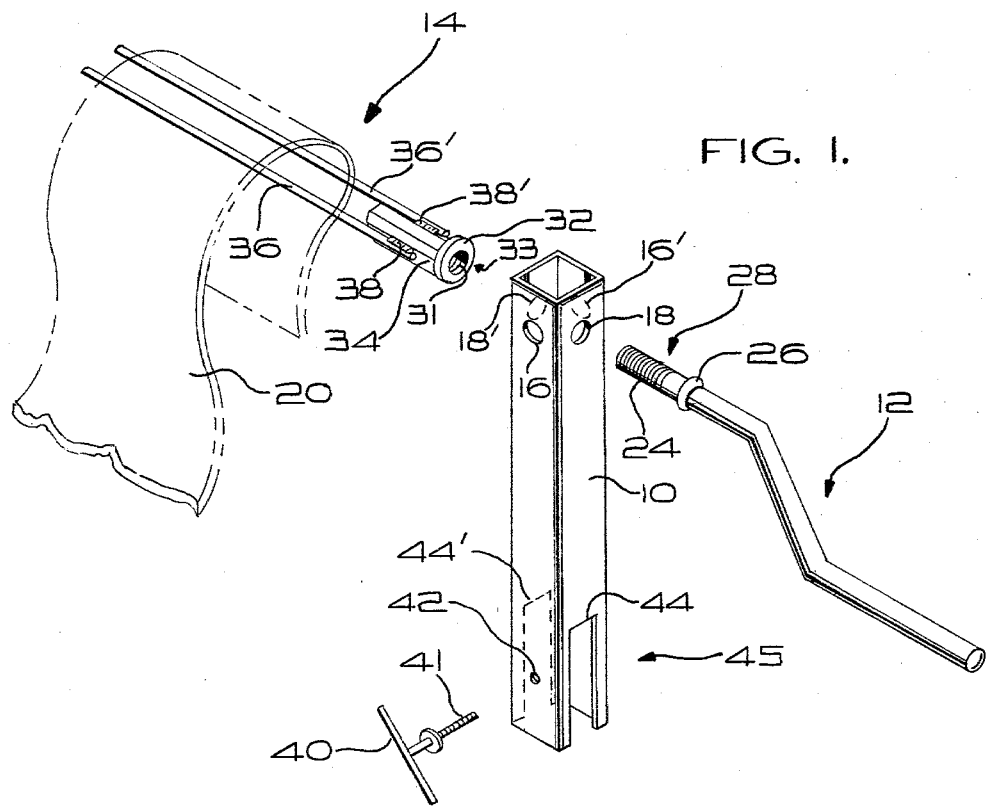
FIG. 1 is an exploded view of the strap winding mechanism showing in phantom a load strap partially rolled thereon.

Shown in FIG. 1 is an elongate stanchion 10 which is used for the upright mounting of the strap winding mechanism in the stake holes of a conventional truck bed. Although it is anticipated that other materials would serve as well, the stanchion 10 in the present embodiment comprises a rectangular steel conduit, capable of withstanding rough usage.

At one end of the stanchion 10 is a clamping mechanism 45 comprising open-ended rectangular slots 44 and 44' extending along the longitudinal axis of the stanchion 10, and a bolt 40 having threads 41 for complementary engagement with the threads of a bolt aperture 42 in the stanchion 10. In a manner hereinafter described, the clamping mechanism will securely mount the stanchion 10 to any selected stake hole at the edge of a truck bed.

At the upper end of the stanchion 10 opposite the clamping mechanism 45, a first set of journal apertures 18 and 18' are located on opposing sides of the stanchion 10 and a second set of journal apertures 16 and 16' are located in an azimuthal attitude of 90° with the first set of journal apertures 18 and 18'.

A strap reel assembly 14 has a hub 34 which can suitably be made hexagonal and of a size to accommodate a conventionally sized box wrench. The hub 34 is joined along the sides thereof to reel prongs 36 and 36' by, for instance, brazes 38 and 38'. On the opposite side of stanchion 10 a reel handle 12 is fixed end-to-end with a reel shaft 28. In a typical assembly of the components, the shaft 28 is first inserted through one set of journal apertures, for instance 18 and 18', so that a threaded male portion 24 of the shaft 28 passes first through the apertures 18 and 18'. Once the threaded portion 24 has been inserted, as in this example, through the set of apertures 18 and 18', the hub 34 of reel assembly 14 can be rotatively engaged with and secured to the shaft 28 by means of threads 31 in aperture 33 of hub 34 which are complementary with the threaded male portion 24 of shaft 28.

A circular retainer 32, fixed to the stanchion-ward side of the hub 34, keeps the hub from adversely engaging the interior of the journal aperture 18' and also serves as a bearing surface for any rotation of the hub 34 against the stanchion 10. The circular retainer 26 between shaft 28 and handle 12 maintains shaft 28 and handle 12 in their respective desired positions within and outside the stanchion 10.

Figure 2:
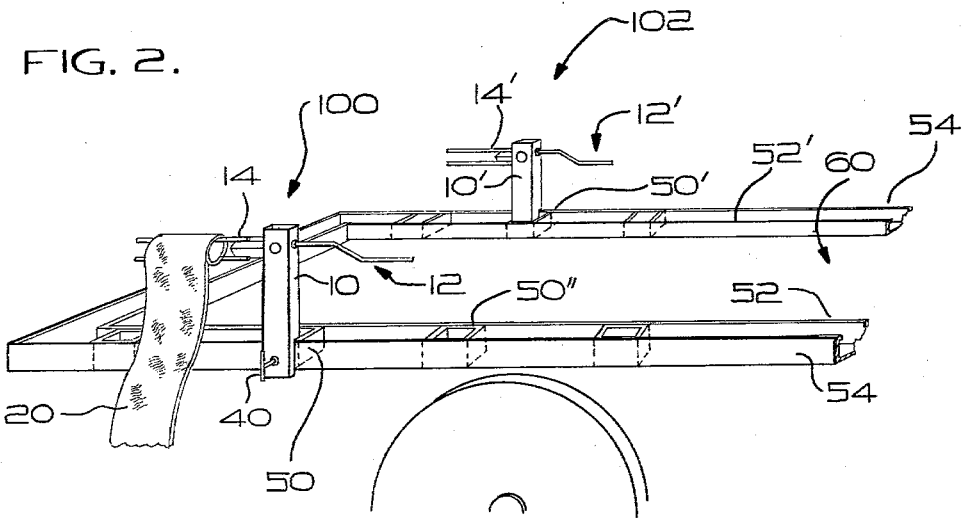
FIG. 2 is a perspective view of a truck bed provided with conventional stake holes showing specifically the method of attachment and use of the strap winding mechanism.

FIG. 2 shows a conventional truck bed 60 having interior side rails 52 and 52', and outside side rails 54 and 54', with stake holes such as 50, 50' and 50" located therebetween. Two of the strap winding mechanisms 100 and 102 of this invention are shown securely yet demountably attached to the respective stake holes 50 and 50'. The first strap winding mechanism 100 has a stanchion 10, a strap reel 14 and a handle 12 and has been engaged with the stake hole 50 so that the stanchion 10 straddles the outer rail 54 on either side of the clamp slots 44 and 44', as shown in FIG. 1. The user of the mechanism turns the clamp bolt 40 through the complementarily threaded bolt aperture 42 as in FIG. 1 and clamp bolt 40 is thus tightened until the side rail 54 is securely gripped between the clamp bolt 40 and that portion of the stanchion 10 straddling the interior of the stake hole 50. The user can then commence to roll any truck load straps or like material onto the prongs 36 and 36'. Load straps or the like are first threaded through the prongs 36 and 36' as shown in FIG. 1. The handle 12 is then turned by the user to roll the strap 20 upon the prongs 36 and 36' which are attached to the hub 34 and engaged for mutual rotation with the handle 12 and shaft 28. The handle 12 is rotated by the user until the strapping material or the like is wound to the extent necessary. The user then merely slides the strap roll axially from the prongs 36 and 36'.

An additional strap reeling mechanism 102 of like construction is shown in FIG. 2 with a strap reel 14', a handle 12', and a stanchion 10' secured into stake hole 50'. The mounting of strap reeling mechanism 102 illustrates the flexibility of the present invention in that the handle 12' and reel assembly 14' have been interchanged in position upon the stanchion 10' with respect to the position of strap reel 14 and handle 12 upon stanchion 10. This illustrated flexibility is useful for avoiding load obstructions, and in allowing the user a maximum number of stake hole choices for mounting of the mechanism and handle orientations for its operation.

Figure 3:
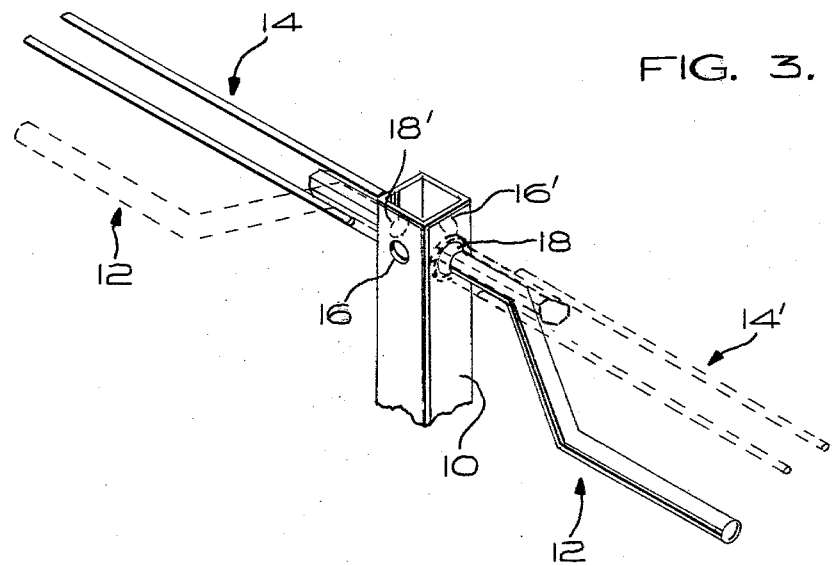
FIG. 3 is a fragmentary view showing the upper portion of the stanchion with the reel handle and strap reel assembly journaled in one set of apertures and showing the flexibility of the mechanism wherein the reel handle and reel assembly are shown in phantom in reversed attitude.

In FIG. 3 a stanchion 10 is shown with a reel handle 12 and strap reel 14 engaged for mutual rotation in the journal apertures 18 and 18'. When the user of the device wishes to interchange the positions of the handle 12 and the strap reel 14 he rotatively disengages the threaded male portion 24 of shaft 28 as shown in FIG. 1 from the complementary threads of aperture 33 and rotatively re-engages these threads as the handle 12' and reel 14' shown in the respective phantom positions in FIG. 3.

Figure 4:
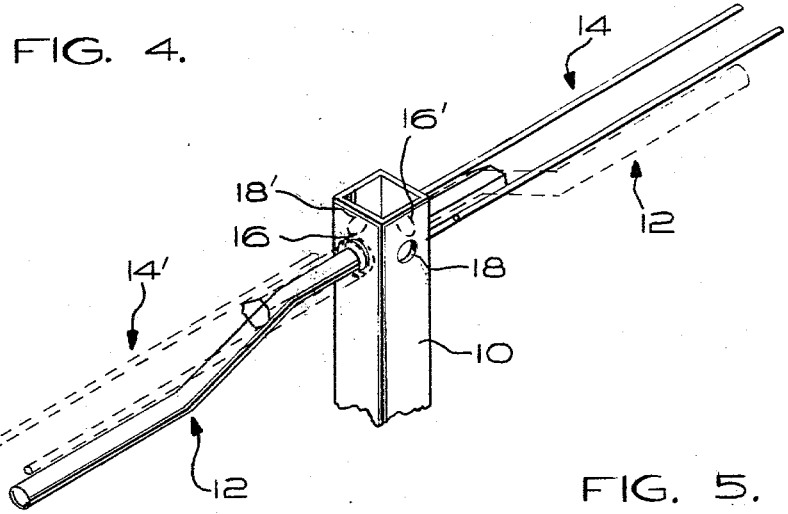
FIG. 4 is a partial view of the upper region of the stanchion showing the reel handle and reel assembly journaled in one set of apertures and showing the flexibility of the mechanism wherein the reel handle and reel assembly are shown interchanged in phantom.

FIG. 4 shows an additional adaptation of the embodiment wherein the stanchion 10 has a reel handle 12 and strap reel assembly 14 engaged for mutual rotation journaled in the second set of apertures 16 and 16'. The same FIG. 4 shows the reel assembly 14 and reel handle 12 interchanged to assume the respective reversed positions 12' and 14' as previously described in FIG. 3.

Figure 5:
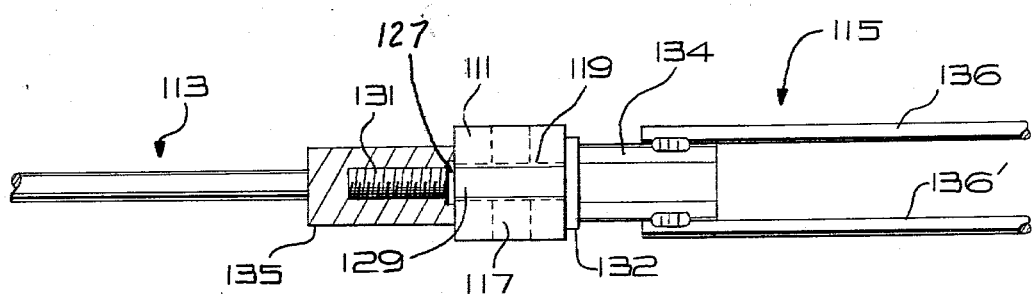
FIG. 5 is a plan view, partially cut-away showing another embodiment of the device, with a modified form of threaded engagement between the reel handle and the strap reel assembly.

FIG. 5 shows a modified embodiment of the present invention wherein a stanchion 111 is constructed of a solid metal block and therefore contains but two journal apertures 119 and 117 which provide a mounting flexibility equivalent with that of the aforementioned sets of journal apertures 16, 16' and 18, 18'. Also embodied in this form of the mechanism is a strap reel assembly 115 comprising the hub 134, retainer 132, reel prongs 136 and 136' affixed thereto and, in addition to these, a shaft 129 and male threaded portion 131 of shaft 129 fixed to the end of the hub 134. In assembly and use, this embodiment is much the same as the previous embodiment except that the hub 134 is now fixed to shaft 129 having the male threaded portion 131. This male threaded portion 131 has complementary threads in a base 135 of reel handle 113 so that once the shaft 129 is inserted through the journal aperture 119 and a threaded engagement is made, the strap reel assembly 115 and handle 113 become engaged for respective rotation. Circular retainers 127 and 132 engage the exterior of the stanchion 111 to provide a bearing surface.

Other adaptations, modifications and variations of the present invention will be apparent to those skilled in the art in view of the foregoing typical and therefore non-limitative examples thereof, within the scope of the following claims.

What is claimed is:

1. A strap winding mechanism for use in connection with a conventional flat bed truck or the like provided with stake holes or the like along the sides thereof, said mechanism comprising:

an elongate stanchion, provided at the lower end thereof with mounting means for engagement with a selected stake hole of the truck bed with the stanchion arranged generally vertically above and at the side of the truck bed;

a plurality of journal apertures through the upper end of said stanchion at various azimithul attitudes with respect to the mounting means at the lower end of the stanchion;

a strap reel assembly comprising a reel hub and, extending therefrom, an open-ended bifurcated section on which the strap is windable and from which wound strapping is readily removable by withdrawal from the open end of such section;

a reel handle connected to said strap reel assembly by threaded connector means, with said reel handle and strap reel assembly being arranged on opposing sides of said stanchion in a selected journal aperture of said stanchion and with said threaded connector means enabling ready disassembly of the strap reel assembly from the reel handle for placement in any selected journal aperture in either direction for convenience of use of the mechanism and enabling ready disassembly of the reel handle, strap reel assembly and stanchion for storage of the mechanism when not in use.

2. The device of claim 1, wherein said elongate stanchion ranges from about nine inches to one foot six inches in height.

3. The device of claim 1, wherein said stanchion comprises an elongate rectangular structure having at least a duality of journal apertures located at the upper end therethrough.

4. The device of claim 1, wherein said journal apertures are a duality of journal apertures with a first journal aperture being at an angle of generally ninety degrees with respect to a second journal aperture.

5. The device of claim 1, wherein said mounting means comprises open-ended slots at the lower end of said stanchion for straddling placement of said stanchion over an outer rail of said truck bed stake holes and further comprises a bolt in threaded engagement with a bolt aperture in the lower end of said stanchion, the outer rail of said truck bed being securable between said stanchion and said clamp bolt.

6. A strap winding mechanism for use in connection with a convention flat bed truck or the like provided with stake holes or the like along the sides thereof, said mechanism comprising:

an elongate stanchion, provided at the lower end thereof with adjustable clamp means for mounting engagement with a selected stake hole of the truck bed, with the stanchion arranged generally vertically above and at the side of the truck bed;

a plurality of generally horizontally arranged journal apertures through the upper end of said stanchion at various azimithul attitudes with respect to the clamp means at the lower end of the stanchion;

a strap reel assembly comprising a reel hub and, extending therefrom, an open-ended bifurcated section on which the strap is windable and from which wound strapping is readily removable by withdrawal from the open end of such section;

a reel handle connected to said strap reel assembly by threaded connector means with said reel handle and strap reel assembly being arranged on opposing sides of said stanchion in a selected journal aperture of said stanchion and with said threaded connector means enabling ready disassembly of the strap reel assembly from the reel handle for placement in any selected journal aperture in either direction for convenience of use of the mechanism and enabling ready disassembly of the reel handle, strap reel assembly and stanchion for storage of the mechanism when not in use.

7. The device of claims 1 or 6 wherein said threaded connector means comprises a reel shaft fixed to said reel handle having male threads thereon and further comprises said reel hub having an aperture with complementary female threads therein for mutual threaded engagement of said reel shaft and reel handle with said strap reel assembly and reel hub on opposing sides of said stanchion.

8. The device of claims 1 or 6 wherein said threaded connector means comprises a reel shaft fixed to said reel hub and having male threads thereon and further comprises said reel handle having a reel base with an aperture and complementary female threads therein for mutual threaded engagement of said reel shaft and strap reel assembly with said reel handle and reel base on opposing sides of said stanchion.

* * * * *